United States Patent
Cho et al.

(10) Patent No.: US 10,558,098 B2
(45) Date of Patent: Feb. 11, 2020

(54) DISPLAY APPARATUS

(71) Applicant: SAMSUNG ELECTRONICS CO., LTD., Suwon-si (KR)

(72) Inventors: Byoung Jin Cho, Anyang-si (KR); Nae Won Jang, Seongnam-si (KR); Seung Hun Chae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/170,862

(22) Filed: Oct. 25, 2018

(65) Prior Publication Data

US 2019/0129213 A1 May 2, 2019

(30) Foreign Application Priority Data

Oct. 27, 2017 (KR) .................. 10-2017-0140746

(51) Int. Cl.
*G02F 1/1347* (2006.01)
*G02F 1/1335* (2006.01)
*G02F 1/1368* (2006.01)

(52) U.S. Cl.
CPC ...... *G02F 1/1347* (2013.01); *G02F 1/133617* (2013.01); *G02F 1/1368* (2013.01); *G02F 1/133528* (2013.01); *G02F 2001/133531* (2013.01); *G02F 2202/108* (2013.01)

(58) Field of Classification Search
CPC ............. G02F 1/1347; G02F 1/133617; G02F 1/133528; G02F 1/1368; G02F 2001/133531; G02F 2202/108
See application file for complete search history.

(56) References Cited

U.S. PATENT DOCUMENTS

| | | |
|---|---|---|
| 2011/0242742 A1 | 10/2011 | Kim et al. |
| 2011/0279749 A1 | 11/2011 | Erinjippurath et al. |
| 2012/0154464 A1 | 6/2012 | Ninan et al. |
| 2014/0036536 A1 | 2/2014 | Gettemy et al. |
| 2014/0293188 A1 | 10/2014 | Chen et al. |
| 2014/0320614 A1 | 10/2014 | Gaudreau |
| 2016/0033822 A1* | 2/2016 | Jiang .................. G02F 1/13338 349/33 |
| 2017/0199400 A1 | 7/2017 | Mok et al. |

OTHER PUBLICATIONS

International Search Report dated Feb. 19, 2019, issued by the International Searching Authority in International Application No. PCT/KR2018/012855 (PCT/ISA/210).

* cited by examiner

*Primary Examiner* — Nathanael R Briggs
(74) *Attorney, Agent, or Firm* — Sughrue Mion, PLLC

(57) ABSTRACT

Provided is a display apparatus including a liquid crystal panel and a shutter panel, wherein the shutter panel includes a shutter layer configured to change a polarizing axis of light transmitted through a selected area, a shutter polarizing layer disposed on a front surface of the shutter layer, and configured to transmit light having the polarizing axis changed by the shutter layer, and a quantum rod layer disposed on a rear surface of the shutter layer, and configured to convert a wavelength of light that is incident to the shutter panel, and to transmit light having a polarizing axis of a predetermined direction to the shutter layer. Therefore, the display apparatus may implement a local dimming structure and improve the optical efficiency.

20 Claims, 9 Drawing Sheets

DISPLAY APPARATUS

CROSS-REFERENCE TO RELATED APPLICATION

This application is based on and claims priority under 35 U.S.C. § 119 to Korean Patent Application No. 10-2017-0140746, filed on Oct. 27, 2017 in the Korean Intellectual Property Office, the disclosure of which is incorporated by reference herein in its entirety.

BACKGROUND

1. Field

The disclosure relates to a display apparatus, and more particularly, to a display apparatus having a local dimming structure.

2. Description of the Related Art

A display apparatus converts acquired or stored electrical information into visual information to display the visual information for users. Display apparatuses are widely used in various fields, such as home or places of business, for displaying a screen.

Examples of the display apparatus include a monitor a television. The display apparatus may use a self-emissive display panel such as an organic light emitting diode (OLED) panel, or a light-receiving display panel such as a liquid crystal display (LCD) panel.

In order to represent a dark part of an image, the display apparatus reduces or turns off light that is emitted from a corresponding part of a backlight. At this time, light arrives at or is diffused to other areas as well as an area corresponding to the dark part of the image, which deteriorates the image quality.

SUMMARY

Provided is a display apparatus having improved light efficiency.

Provided is a display apparatus having an improved local dimming structure.

Provided is a display apparatus having a simple structure.

Additional aspects of the disclosure will be set forth in part in the description which follows and, in part, will be obvious from the description, or may be learned by practice of the disclosure.

In accordance with an aspect of the disclosure, there is provided a display apparatus including a light source configured to emit light, and a display panel configured to receive the light emitted from the light source, wherein the display panel includes a liquid crystal panel, and a shutter panel configured to selectively transmit light received from the light source toward the liquid crystal panel, wherein the shutter panel includes a shutter layer including a selected area configured to change a polarizing axis of light being transmitted therethrough, a shutter polarizing layer disposed on a first surface of the shutter layer, the shutter polarizing layer being configured to transmit light having the polarizing axis changed by the shutter layer, and a quantum rod layer disposed on a second surface of the shutter layer that is opposite to the first surface, of the shutter layer, the quantum rod layer being configured to convert a wavelength of light incident on the shutter panel, and to transmit light having a polarizing axis of a predetermined direction to the shutter layer.

The quantum rod layer may be further configured to transmit light forming a polarizing axis of a first direction, a polarizing axis of light transmitted from the quantum rod layer may be changed from the first direction to a second direction when the light is transmitted through the selected area of the shutter layer, and the light transmitted through the selected area may be transmitted through the shutter polarizing layer.

The shutter layer may further include an unselected area configured to maintain a polarizing axis of light, and the shutter polarizing layer may be configured to block light transmitted through the unselected area.

The display apparatus according to claim 2, wherein the first direction is orthogonal to the second direction.

The liquid crystal panel and the shutter panel may be controlled independently.

The shutter layer may include a plurality of operating units configured to individually operate as any one of the selected area configured to change the polarizing axis of light and an unselected area configured to maintain a polarizing axis of light.

The liquid crystal panel may include a plurality of pixels configured to form an image, and one operating unit of the plurality of operating units may be disposed to correspond to at least one pixel of the plurality of pixels.

The plurality of operating units may be disposed to correspond to the plurality of pixels, respectively.

The plurality of operating units may operate independently.

The shutter layer may be formed with a plurality of liquid crystal molecules configured to change arrangement based on a presence of an electric field to change a polarizing axis of incident light.

The shutter panel may have a width corresponding to the liquid crystal panel.

The display panel may further include a first polarizing plate disposed on a first surface of the liquid crystal panel, the first polarizing plate being configured to transmit light transmitted through the shutter polarizing layer, and a second polarizing plate disposed on a second surface of the liquid crystal panel, opposite to the first surface, the second polarizing plate being configured to transmit light having a polarizing axis that is changed by the liquid crystal panel.

The shutter panel may be disposed between the liquid crystal panel and the light source.

The quantum rod layer may be disposed between the shutter layer and the light source.

In accordance with an aspect of the disclosure, there is provided a display apparatus including a display panel configured to receive light emitted from a light source, wherein the display panel includes a liquid crystal panel having a plurality of pixels configured to form an image, and a shutter panel disposed between the liquid crystal panel and the light source, wherein the shutter panel includes a shutter layer including a plurality of operating units individually operating for one of a selected area and an unselected area, the shutter layer being configured to change a polarizing axis of light being transmitted through the selected area, a shutter polarizing layer disposed on a first surface of the shutter layer, and the shutter polarizing layer being configured to transmit the light having the polarizing axis changed by the shutter layer, and a quantum rod layer configured to convert a wavelength of light incident on the shutter panel, and to cause the incident light to form a polarizing axis of a predetermined direction.

The one operating unit among the plurality of operating units may be disposed to correspond to at least one pixel of the plurality of pixels.

The quantum rod layer may be configured to transmit light forming a polarizing axis of a first direction, a polarizing axis of light transmitted from the quantum rod layer may be changed from the first direction to a second direction when the light is transmitted through the selected area of the shutter layer, and the light transmitted through the selected area may be transmitted through the shutter polarizing layer.

The unselected area is different from the selected area, and the shutter polarizing layer is configured to block light through the unselected area.

The first direction may be orthogonal to the second direction.

In accordance with an aspect of the disclosure, there is provided a display apparatus including a light source configured to emit light, and a display panel configured to receive the light emitted from the light source, wherein the display panel includes a liquid crystal panel, a shutter panel including a shutter layer operating as a selected area and a unselected area, and at least one polarizing layer configured to transmit light being transmitted through the selected area, the shutter layer being configured to selectively block light transmitted toward the liquid crystal panel, and a quantum rod layer disposed between the liquid crystal panel and the shutter panel, the quantum rod layer being configured to convert a wavelength of light incident on the liquid crystal panel and to cause the light incident on the liquid crystal panel to have a polarizing axis of a predetermined direction.

In accordance with an aspect of the disclosure, there is provided a display apparatus including a light source configured to emit light, and a display panel configured to receive the light emitted from the light source, wherein the display panel includes a first polarizing plate, a liquid crystal panel, a second polarizing plate, a shutter layer including a plurality of operating units individually operating for one of a selected area and an unselected area, the shutter layer being configured to change a polarizing axis of light transmitted through the selected area, a shutter polarizing layer disposed on a first surface of the shutter layer, and the shutter polarizing layer being configured to transmit the light having the changed polarizing axis by the shutter layer, and a quantum rod layer configured to convert a wavelength of light incident on the shutter layer, and to cause the incident light to form a polarizing axis of a predetermined direction.

The display apparatus may further include a diffuser layer to diffuse light from the quantum rod layer toward the display panel.

BRIEF DESCRIPTION OF THE DRAWINGS

The above and other aspects, features, and advantages of certain embodiments of the present disclosure will become apparent from the following description taken in conjunction with the accompanying drawings, in which.

DETAILED DESCRIPTION

Figure 1:
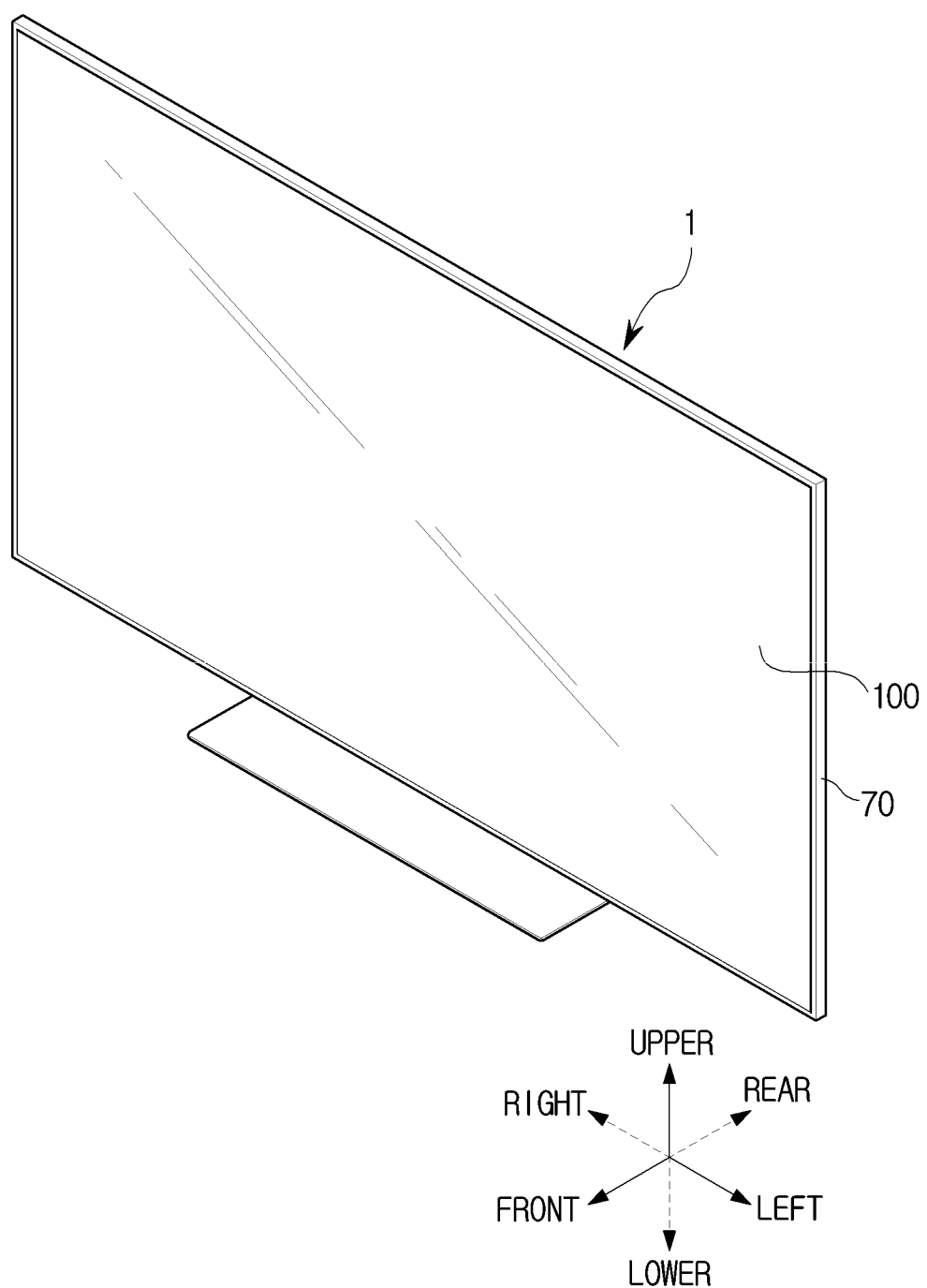
FIG. 1 is a perspective view of a display apparatus according to an embodiment.

Reference will now be made in detail to embodiments, examples of which are illustrated in the accompanying drawings, wherein like reference numerals refer to the like elements throughout.

The terms used in the present specification are used to describe the embodiments of the present disclosure. Accordingly, it should be apparent to those skilled in the art that the following description of embodiments of the present disclosure is provided for illustration purpose only and not for the purpose of limiting the disclosure as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

As used herein, the terms "1st" or "first" and "2nd" or "second" may use corresponding components regardless of importance or order and are used to distinguish one component from another without limiting the components. Also, as used herein, the term "and/or" includes any and all combinations of one or more of the associated listed items.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Also, in this specification, the terms "front," "rear," "upper," "lower," right," and "left" are defined based on the directions illustrate in FIG. 1, but the terms may not restrict the shape and position of the respective components.

Figure 2:
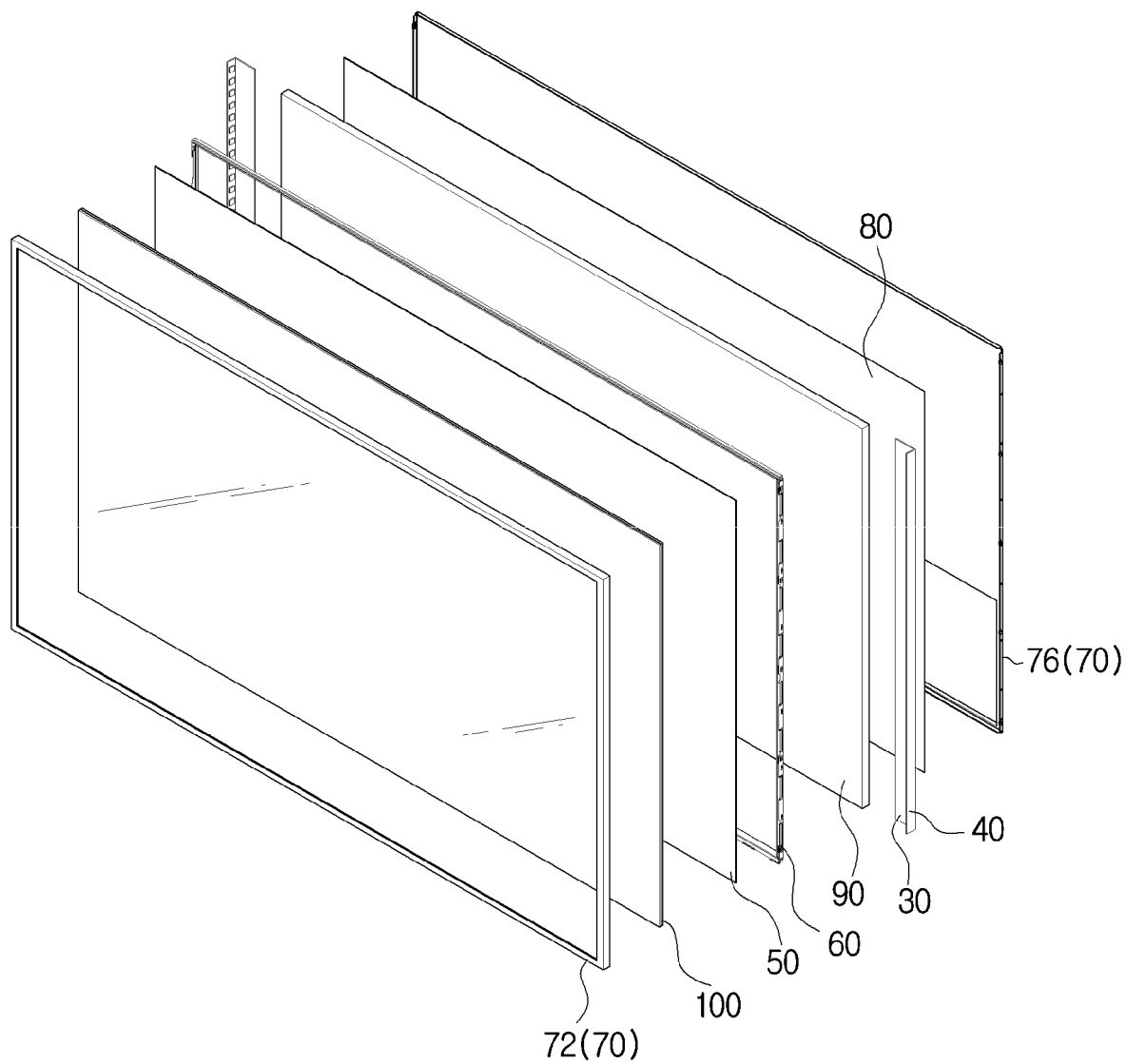
FIG. 2 is an exploded perspective view of a display apparatus according to an embodiment.
Figure 3:
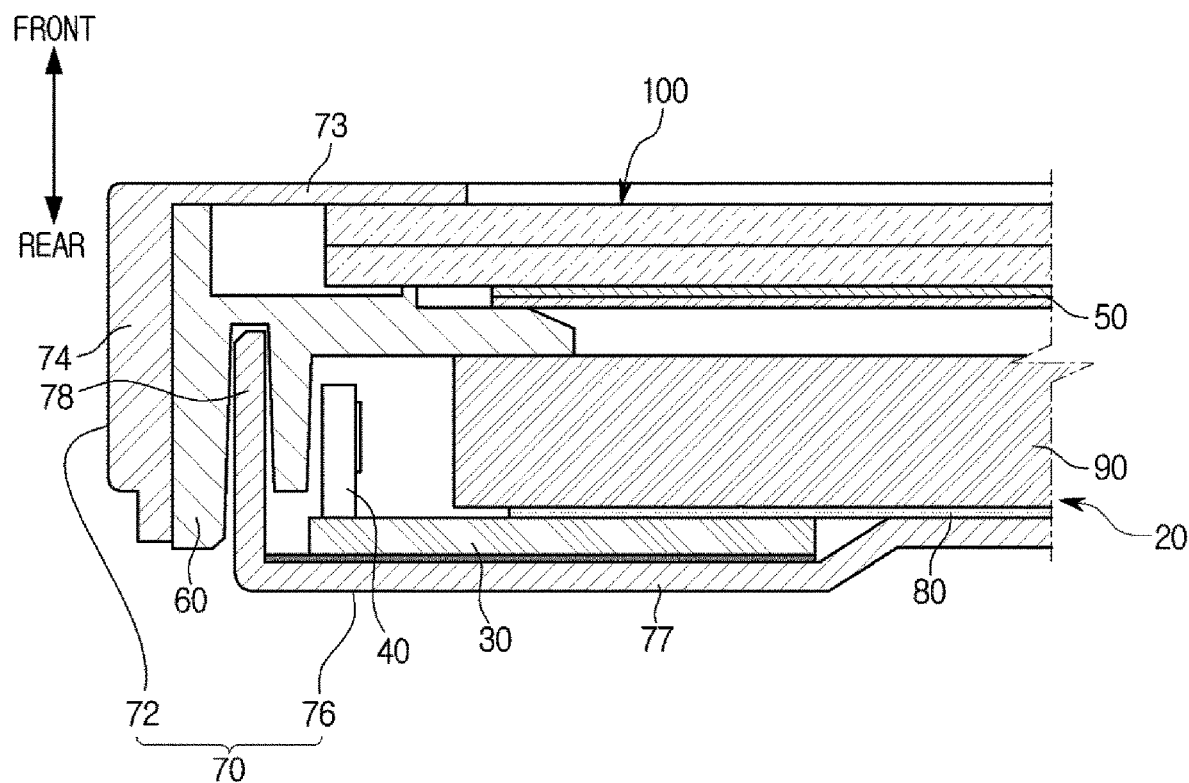
FIG. 3 is a cross-sectional view of a display apparatus according to an embodiment.

FIG. 1 is a perspective view of a display apparatus according to an embodiment, FIG. 2 is an exploded perspective view of a display apparatus according to an embodiment, and FIG. 3 is a cross-sectional view of a display apparatus according to an embodiment.

The following descriptions of the present disclosure relate to a flat display apparatus 1, however, the display apparatus 1 may be a curved display apparatus having a screen of a fixed curvature, or a bendable display apparatus having a screen of a changeable curvature, although not limited thereto.

The display apparatus 1 may include a display module for displaying images therein.

The display module may include a display panel 100 on which images are displayed, and a backlight unit 20 for supplying light to the display panel 100. The backlight unit 20 may be configured to transfer light to the display panel 100 in a plane direction. The backlight unit 20 may include a printed circuit board (PCB) 30 disposed at the left and ride side of a light guide plate 90, a light source module 40 disposed on the PCB, a light guide plate 90, and an optical sheet 50. That is, the backlight unit 20 may include the light source module 40 disposed behind the display panel 100, the light guide plate 90 disposed in space between the display panel 100 and the light source module 40 and configured to diffuse light supplied from the light source module 40 and transfer the light to the display panel 100 located in front of the light guide plate 90, and the optical sheet 50 is disposed between the display panel 100 and the light source module 40 and configured to change the optical property of light diffused from the light guide plate 90 toward the display panel 100. The display apparatus 1 may include a middle mold 60 for supporting the display panel 100, and a display chassis 70 forming an outer appearance of the display apparatus 1. The display chassis 70 may include a top chassis 72 coupled with a front portion of the middle mold 60 to maintain a state in which the display panel 100 is installed in the middle mold 60, and a bottom chassis 76 coupled with a rear portion of the middle mold 60, wherein the light source module 40 is disposed at both right and left inner sides of the bottom chassis 76.

The light source module 40 may be disposed in front of the bottom chassis 76 to radiate light toward the display panel 100. The light source module 40 may include a light emitting device that emits blue light. The blue light may be converted to at least one of red light, green light, and blue light by a quantum rod layer 170 which will be described later. The embodiments of the present disclosure relate to an edge type display method, however, embodiments are not limited thereto, and may be applied, for example, to a direct type display method.

On the middle mold 60, the display panel 100 and the top chassis 72 may be disposed in this order from the center front portion to the peripheral side front portions of the middle mold 60, and the bottom chassis 76 may be disposed on a rear side of the middle mold and configured to support the individual components, while maintaining a state in which the display panel 100 is spaced apart from the bottom chassis 76.

The top chassis 72 may include a bezel portion 73 covering front edges of the display panel 100, and a top side portion 74 bent from the end of the bezel portion 73 to cover sides of the middle mold 60.

The bottom chassis 76 may include a rear portion 77 forming a rear surface of the display module, and a bottom side portion 78 extending in the front direction from edges of the rear portion 77 and coupled in the middle mold 60. The bottom chassis 76 may be in the shape of a polygonal plate having high strength, and include a metal material, for example, aluminum, an aluminum alloy, etc., having low thermal deformation against heat emitted from a light source and/or the display panel 100 accommodated therein. The bottom chassis 76 may be molded with a plastic material, for example, poly carbonate (PC), or a material resulting from adding glass fiber to a plastic material.

A plurality of light source modules 40 may be mounted on the PCB 30. The size of the PCB 30 may correspond to a length in an up-down direction of the display panel 100. According to an embodiment, the plurality of light source modules 40 may be arranged to correspond to a height in the up-down direction of the display apparatus 1, although embodiments are not limited thereto.

A reflective sheet 80 may reflect light radiated from the light source module 40 toward the display panel 100, or re-reflect light re-reflected by the optical sheet 50, the display panel 100, etc. toward the display panel 100. The reflective sheet 80 may be disposed on a front surface of the PCB 30 to reflect leaking light toward the display panel 100, thereby improving the optical efficiency of the display apparatus. The reflective sheet 80 may be disposed between the light guide plate 90 and the bottom chassis 76. The reflective sheet 80 may be coated with a high reflection coating agent, for example, silver, $TiO_2$, of white or silver color. The reflective sheet 80 may include a reflective plate.

The optical sheet 50 may cause light radiated from the light source module 40 and traveling toward the display panel 100 to have higher uniformity in brightness. Light of higher uniformity in brightness passed through the optical sheet 50 may be incident on the display panel 100. The optical sheet 50 may include a protective sheet, a prism sheet, or a diffuser sheet. The optical sheet 50 may include at least one piece.

Figure 4:
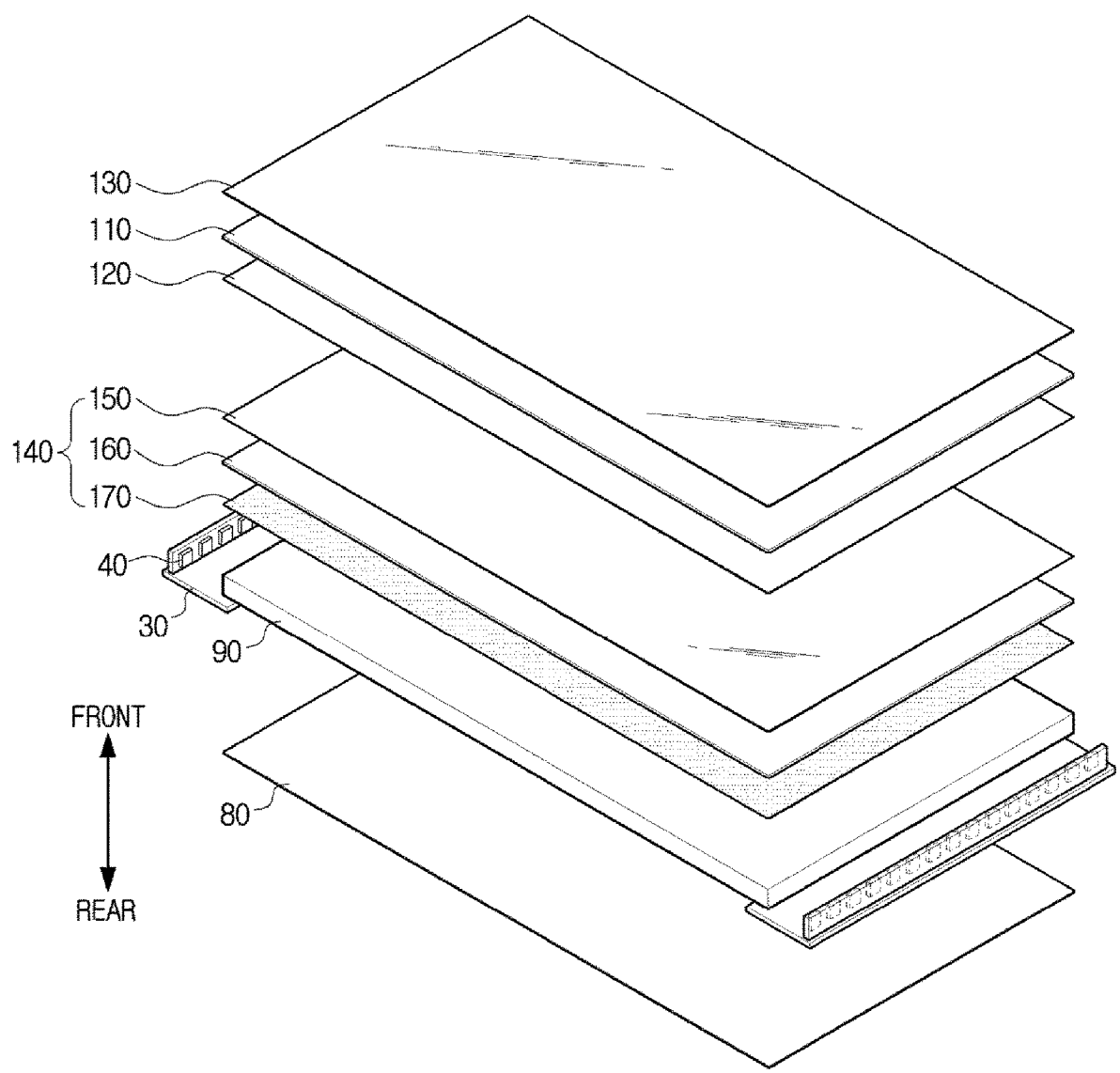
FIG. 4 is an exploded perspective view of a part of a display apparatus according to an embodiment.
Figure 5:
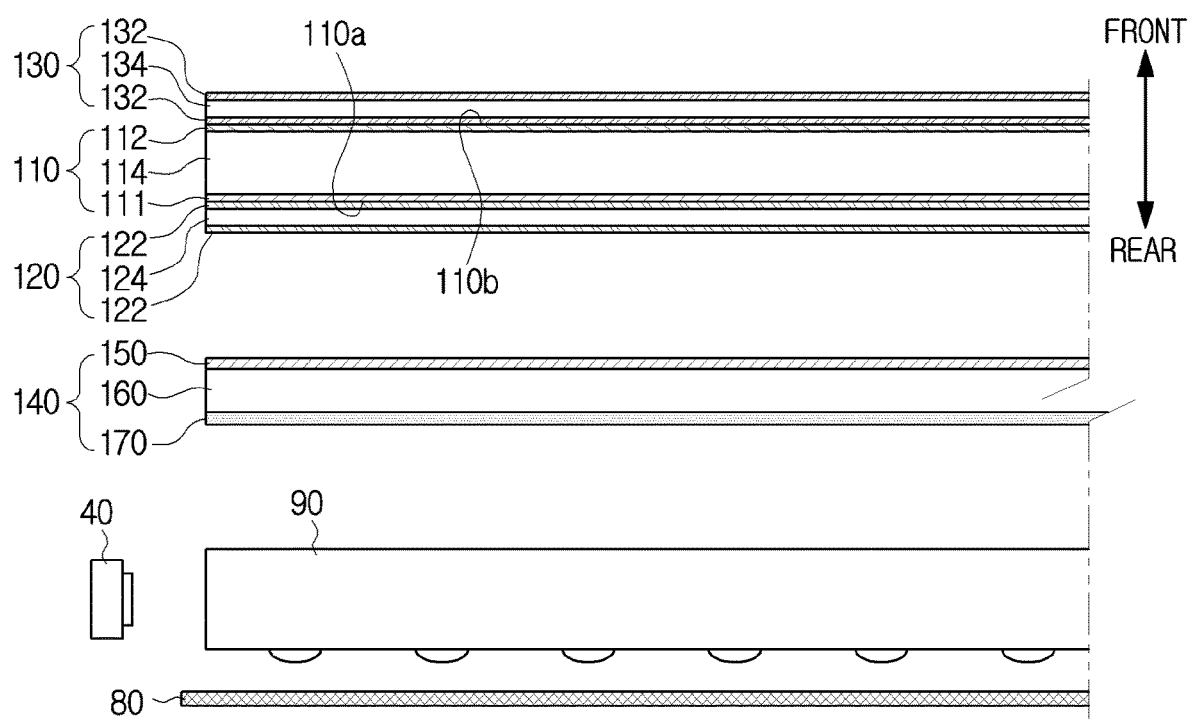
FIG. 5 shows a display panel and a backlight unit of a display apparatus according to an embodiment.
Figure 6:
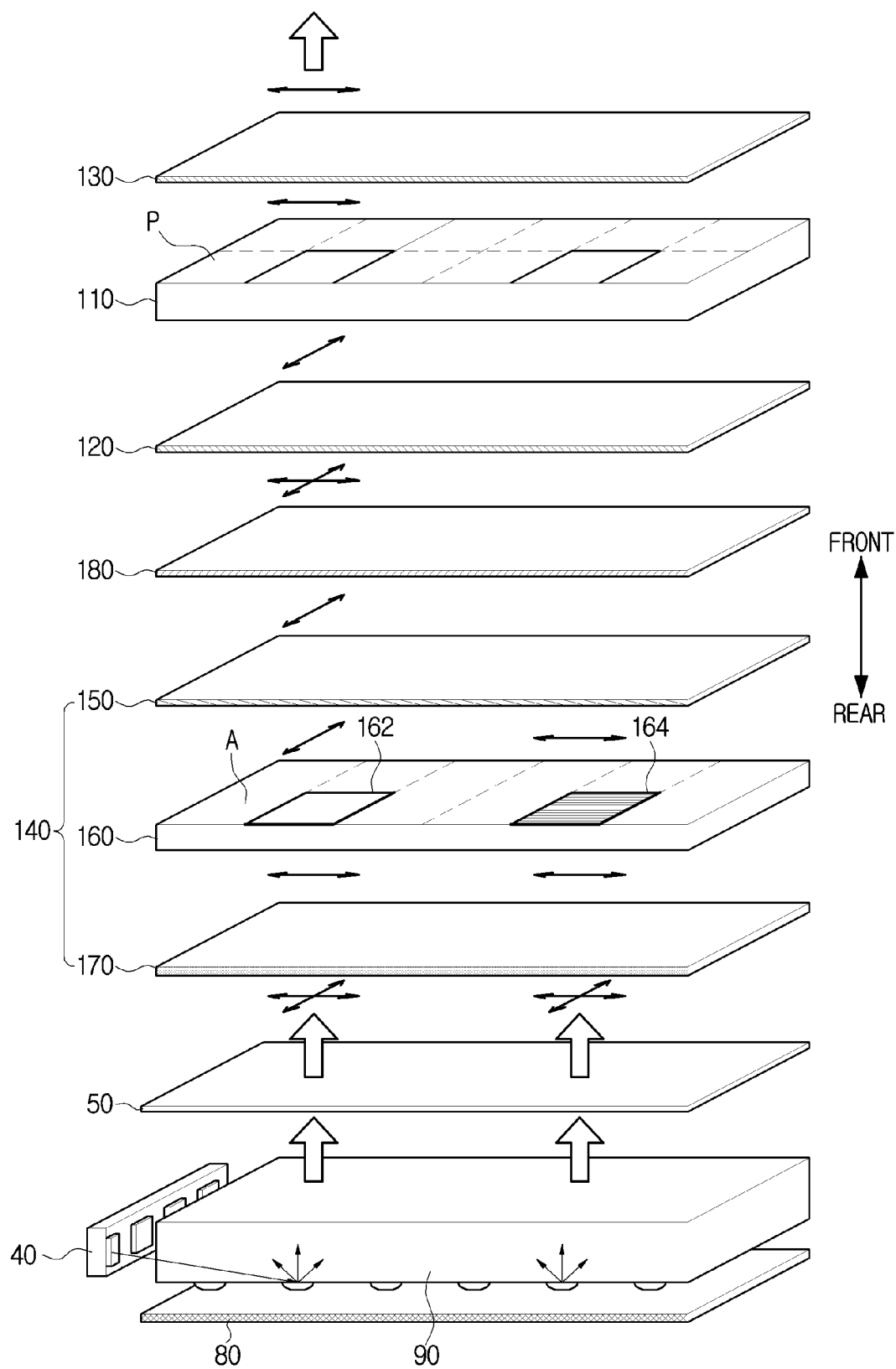
FIGS. 6 and 7 show light paths of a display apparatus according to an embodiment.
Figure 7:
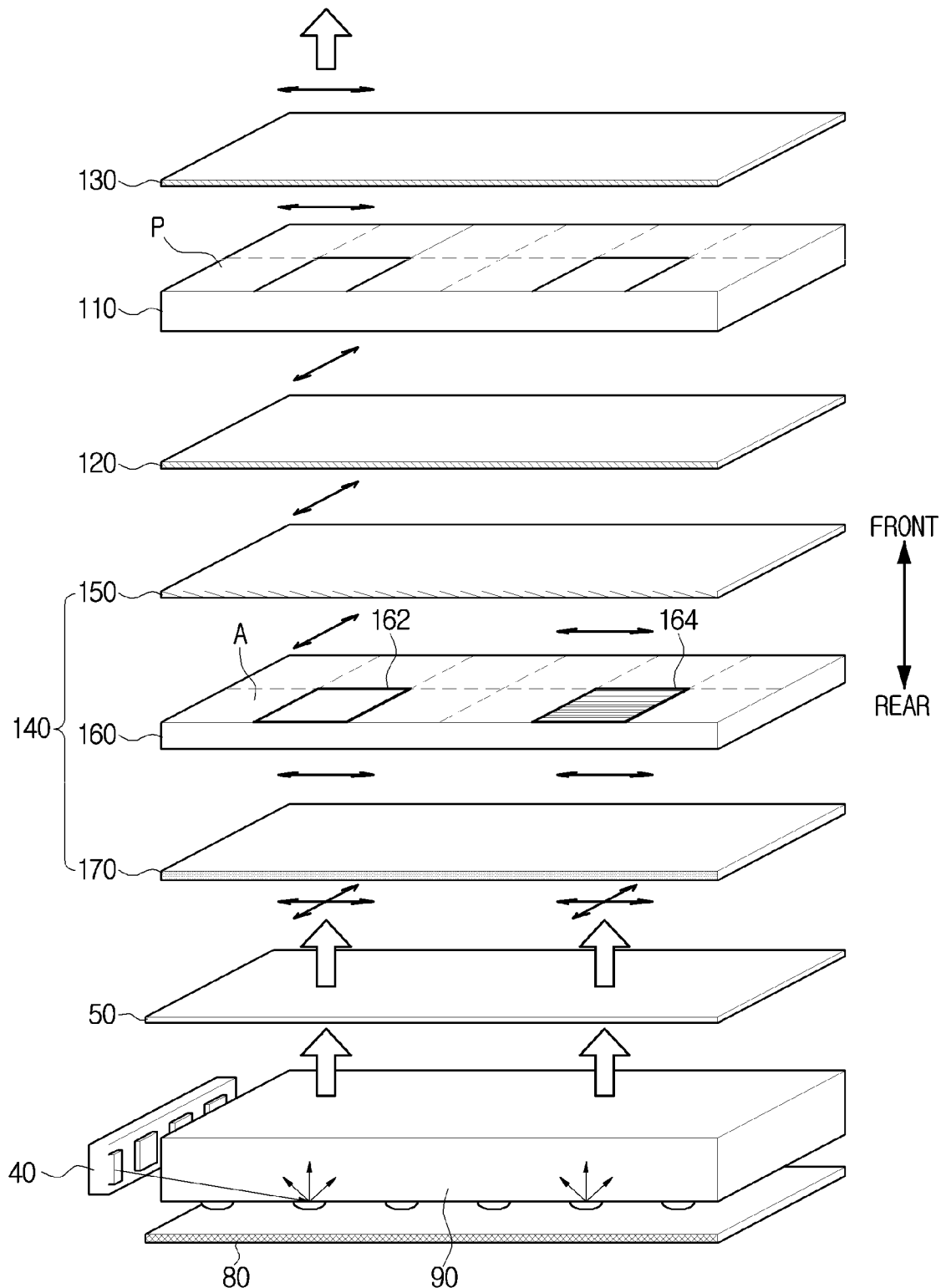

FIG. 4 is an exploded perspective view of a part of a display apparatus according to an embodiment, FIG. 5 shows a display panel and a backlight unit of a display apparatus according to an embodiment, and FIGS. 6 and 7 show light paths of a display apparatus according to an embodiment.

The display panel 100 may convert an electrical signal to an optical signal to display an image. The display panel 100 may include a liquid crystal panel 110 and a plurality of polarizing plates 120 and 130.

The liquid crystal panel 110 may be disposed in front of the backlight unit 20 to block or transmit light emitted from the backlight unit 20 in order to form an image.

The front surface of the liquid crystal panel 110 may form a screen of the display apparatus 1 described above, and may be configured with a plurality of pixels. The plurality of pixels included in the liquid crystal panel 20 may block or transmit light emitted from the backlight unit 20, independently. Light transmitted by the plurality of pixels may form an image that is displayed on the display apparatus 1.

The liquid crystal panel 110 may include first and second transparent substrates 111 and 112 and a liquid crystal layer 114. Also, the liquid crystal panel 110 may include a pixel electrode, a thin film transistor, a common electrode, and a color filter. The first and second transparent substrates 111 and 112 may form an outer appearance of the liquid crystal panel 110, and protect a liquid crystal layer 114, a color filter, etc. disposed therebetween. The first and second transparent substrates 111 and 112 may be made of, for example, tempered glass or a transparent resin.

Liquid crystal is an intermediate state between a solid (crystal) state and a liquid state. When a material in a solid state is heated, the material changes from the solid state to a transparent liquid state at its melting temperature. However, when a liquid crystal material in a solid state is heated, the liquid crystal material changes to an opaque, turbid liquid at its melting temperature, and then changes to a transparent liquid state. Most of liquid crystal materials are organic compounds. A molecule of a liquid crystal material is in the shape of a thin, long rod. Also, the molecular arrangement of the liquid crystal material is irregular when seen in a specific direction, but appears as a regular crystalloid pattern when seen in another direction. Accordingly, the liquid crystal has both the fluidity of a liquid and the optical anisotropy of a crystal (solid).

Also, liquid crystal may show an optical property according to a change in electric field. For example, the direction of the molecular arrangement of liquid crystal may change according to a change in electric field.

When an electric field is formed in the liquid crystal layer 114, liquid crystal molecules of the liquid crystal layer 114 may be arranged according to the direction of the electric field, and when no electric field is formed in the liquid crystal layer 114, the liquid crystal molecules may be arranged irregularly or according to an alignment layer.

As a result, the optical property of the liquid crystal layer 114 may change according to the presence/absence of an electric field passing through the liquid crystal layer 114. For example, when no electric field is formed in the liquid crystal layer 114, light polarized by a first polarizing film 124 may pass through the liquid crystal layer 114 and then pass through a second polarizing film 134 due to the arrangement of the liquid crystal molecules of the liquid crystal layer 114. Meanwhile, when an electric field is formed in the liquid crystal layer 114, the arrangement of the liquid crystal molecules of the liquid crystal layer 114 may change so that light by the first polarizing film 124 may not pass through the second polarizing film 134.

On the outer surfaces of the first and second transparent substrates 111 and 112, a plurality of polarizing plates 120 and 130 may be disposed.

The polarizing plates 120 and 130 may include a first polarizing plate 120 disposed on the outer surface of the first transparent substrate 111, and a second polarizing plate 130 disposed on the outer surface of the second transparent substrate 112.

The first polarizing plate 120 may be in contact with a first surface 110*a* of the liquid crystal panel 110. The first polarizing plate 120 may include a first protective film 122 and the first polarizing film 124. A pair of first protective films 122 may be provided to protect front and rear surfaces of the first polarizing film 124. The first protective film 122 may be made of a material having higher durability and a non-optical property. The first protective film 122 may include, for example, a tri-acetyl cellulose (TAC) film, polyethylene terephthalate (PET), and acryl.

The first polarizing film 124 may be in contact with the first protective film 122. According to an embodiment, the first polarizing film 124 may be disposed between the pair of first protective films 122. The first polarizing film 124 may include, for example, polyvinyl alcohol (PVA). The first polarizing film 124 may include a dichromatic material that polarizes light in a specific direction in, for example, polyvinyl alcohol (PVA).

The second polarizing plate 130 may be in contact with a second surface 110*b* of the liquid crystal panel 110. The second polarizing plate 130 may include a second protective film 132 and the second polarizing film 134. A pair of second protective films 132 may be provided to protect front and rear surfaces of the second polarizing film 134. The second protective film 132 may be made of a material having higher durability and a non-optical property. The second protective film 132 may include, for example, a tri-acetyl cellulose (TAC) film, polyethylene terephthalate (PET), and acryl.

The second polarizing film 134 may be in contact with the second protective film 132. According to an embodiment, the second polarizing film 134 may be positioned between the pair of second protective films 132. The second polarizing film 134 may include polyvinyl alcohol (PVA). The second polarizing film 134 may include a dichromatic material that polarizes light in a specific direction in polyvinyl alcohol (PVA).

Light may be configured with a pair of an electric field and a magnetic field vibrating in a direction that is orthogonal to the traveling direction of the light. Also, the electric field and the magnetic field may vibrate in all directions that are orthogonal to the traveling direction of the light. A phenomenon in which the electric field or the magnetic field vibrates only in a specific direction is called polarization, and a film of transmitting light including an electric field or a magnetic field vibrating in a predetermined direction and blocking light including an electric field and a magnetic field vibrating in the other directions except for the predetermined direction is called a polarizing film. In other words, a polarizing film may transmit light vibrating in a predetermined direction, and block light vibrating in the other directions.

The first polarizing film 124 may transmit light having an electric field and a magnetic field vibrating in a first direction, and block the other light. Also, the second polarizing film 134 may transmit light having an electric field and a magnetic field vibrating in a second direction, and block the other light. Herein, the first direction may be orthogonal to the second direction. In other words, a polarizing direction of light transmitted by the first polarizing film 124 may be orthogonal to a vibrating direction of light transmitted by the second polarizing film 134. As a result, light may not be transmitted at the same time through both the first polarizing film 124 and the second polarizing film 134.

The display panel 100 may include a shutter panel 140. The shutter panel 140 may include a shutter layer 160 and the quantum rod layer 170.

The shutter panel 140 may be provided to limit at least a portion of light supplied from the backlight unit 20 to the liquid crystal panel 110. That is, the shutter panel 140 may be configured to block light in some areas in order to implement local dimming.

The shutter panel 140 may be disposed in front of the backlight unit 20 to block or transmit light emitted from the backlight unit 20. That is, the shutter panel 140 may selectively limit the traveling of light toward the liquid crystal panel 110 from the light source. The shutter panel 140 may limit the traveling of light in at least one area.

In order to selectively limit the traveling of light with respect to a portion of the entire area of light that is incident to the liquid crystal panel 110 from the light source, the shutter panel 140 may correspond to the width of the liquid crystal panel 110.

The shutter panel 140 may be disposed behind the liquid crystal panel 110. That is, the shutter panel 140 may be disposed between the backlight unit 20 and the liquid crystal panel 110. Also, the shutter panel 140 may be disposed between the light source module 40 and the liquid crystal panel 110. Therefore, the shutter panel 140 may limit travel of light of at least one area among surface light supplied from the backlight unit 20 or the light source module 40.

Also, since the shutter panel 140 is disposed behind the liquid crystal panel 110, light incident from the outside of the display apparatus 1 may be reduced or prevented from arriving at the quantum rod layer 170 of the shutter panel 140, which will be described later. That is, the shutter panel 140 may reduce or prevent outside light from arriving at the quantum rod layer 170 that may deteriorate the image quality due to light emitted from the quantum rod layer 170.

A quantum rod may be accommodated in the quantum rod layer 170. The quantum rod layer 170 may be disposed between the shutter layer 160 and the light source or between the shutter layer 160 and the backlight unit 20.

The quantum rod may have a photoluminescence property that emits light using incident light. Light passed through the quantum rod may have a specific polarizing axis by the arrangement of the quantum rod. That is, the quantum rod may emit light in a polarized state, and adjust the arrangement to thus adjust the polarizing axis of light to be emitted.

Since the quantum rod has a relatively high extinction coefficient and quantum yield, the quantum rod may emit stronger fluorescence. Therefore, by adjusting the diameter of the quantum rod, it may be possible to adjust the wavelength of visible light to be emitted. The quantum rod may have a polarization property that emits light linearly-polarized in a direction that is in parallel to the longitudinal direction, and the quantum rod may have an optical property in which electrons are separated from positive holes to adjust the luminescence when an external electric field is applied by the stark effect.

The quantum rod may convert blue light supplied from the light source module 40 to at least one of red light, green light, and blue light.

The shutter panel 140 may include a shutter polarizing layer 150.

The shutter polarizing layer 150 may have a polarizing axis having a different direction from the polarizing axis of the quantum rod layer 170. More specifically, when the direction of the polarizing axis of the quantum rod layer 170 is referred to as a first polarizing direction and the direction of the polarizing axis of the shutter polarizing layer 150 is referred to as a second polarizing direction, the first polarizing direction may be orthogonal to the second polarizing direction. As a result, light may not be transmitted through both the quantum rod layer 170 and the shutter polarizing layer 150 at the same time.

The shutter layer 160 may be disposed between the quantum rod layer 170 and the shutter polarizing layer 150.

As shown in FIGS. 6 and 7, the shutter layer 160 may include a plurality of operating units A. The shutter layer 160 may have the plurality of operating units A to correspond to the plurality of pixels P of the liquid crystal panel 110. However, a predetermined number of pixels P may be arranged to correspond to one operating unit A of the shutter layer 160, and a plurality of pixels P arranged in a predetermined direction may correspond to one operating unit A of the shutter layer 160. The liquid crystal panel 110 and the shutter panel 140 may be controlled independently. Therefore, the plurality of operating units A of the shutter layer 160 may operate independently with respect to the plurality of pixels P of the liquid crystal panel 110.

Also, the plurality of operating units A may operate independently to block or transmit light traveling toward the liquid crystal panel 110 from the backlight unit 20.

The shutter layer 160 may be formed with liquid crystal. When an electric field is formed in the shutter layer 160, liquid crystal molecules of the shutter layer 160 may be arranged according to a direction of the electric field, and when no electric field is formed in the shutter layer 160, the liquid crystal molecules may be arranged irregularly or according to the alignment layer. Since the shutter layer 160 is formed with liquid crystal, the liquid crystal panel 110 may be referred to as a first liquid crystal panel, and the shutter layer 160 may be referred to as a second liquid crystal panel.

As a result, the optical property of the shutter layer 160 may change depending on the presence/absence of an electric field passing through the shutter layer 160. For example, when no electric field is formed in the shutter layer 160, light polarized by the quantum rod layer 170 may pass through the shutter layer 160 and then pass through the shutter polarizing layer 150 due to the arrangement of the liquid crystal molecules of the shutter layer 160.

Meanwhile, when an electric field is formed in the shutter layer 160, the arrangement of the liquid crystal molecules of the shutter layer 160 may change so that light polarized by the quantum rod layer 170 may not pass through the shutter polarizing layer 150.

As shown in FIGS. 6 and 7, the shutter layer 160 may include a selected area 162 and an unselected area 164. The plurality of operating units A of the shutter layer 160 may operate individually as any one of the selected area 162 and the unselected area 164.

When no electric field is formed in the operating units A, the operating units A may operate as the selected area 162, and when an electric field is formed in the operating units A, the operating units A may operate as the unselected area 164. That is, an operating unit A operating as the selected area 162 may change the polarizing direction of light polarized by the quantum rod layer 170, as shown in FIGS. 6 and 7. In contrast, an operating unit B operating as the unselected area 164 may maintain the polarizing direction of light polarized by the quantum rod layer 170, as shown in FIGS. 6 and 7.

When light polarized to the first polarizing direction by the quantum rod layer 170 passes through the selected area 162, the light may be polarized to the second polarizing direction, and then pass through the shutter polarizing layer 150. In contrast, when light polarized to the first polarizing direction by the quantum rod layer 170 passes through the unselected area 164, the light may have the first polarizing direction, and accordingly the light may not pass through the shutter polarizing layer 150.

In order to reduce or prevent the intensity of light from being reduced when the light passes through the shutter layer 160 and the shutter polarizing layer 150, the shutter panel 140 may provide light incident to the shutter layer 160 with the polarizing property of light when the light passes through the quantum rod layer 170, and simultaneously emit stronger fluorescence, thereby improving the intensity of the light.

The display panel 100 may include a diffuser layer 180. The diffuser layer 180 may be disposed between the shutter panel 140 and the first polarizing plate 124 of the liquid crystal panel 110. The diffuser layer 180 may remove noise that may be generated by overlapping of the liquid crystal panel 110 and the shutter panel 140. The display panel 100 may include the diffuser layer 180, as shown in FIG. 6, and as shown in FIG. 7, the display panel 100 may not include the diffuser layer 180.

The diffuser layer 180 may diffuse polarized light passed through the shutter polarizing layer 150. Light passed through the diffuser layer 180 may pass through the first polarizing plate 120 to become light having a polarizing axis of a predetermined direction, as shown in FIG. 6.

Hereinafter, a display apparatus according to an embodiment of the present disclosure will be described. Descriptions about the same components as those described above will be omitted.

Figure 8:
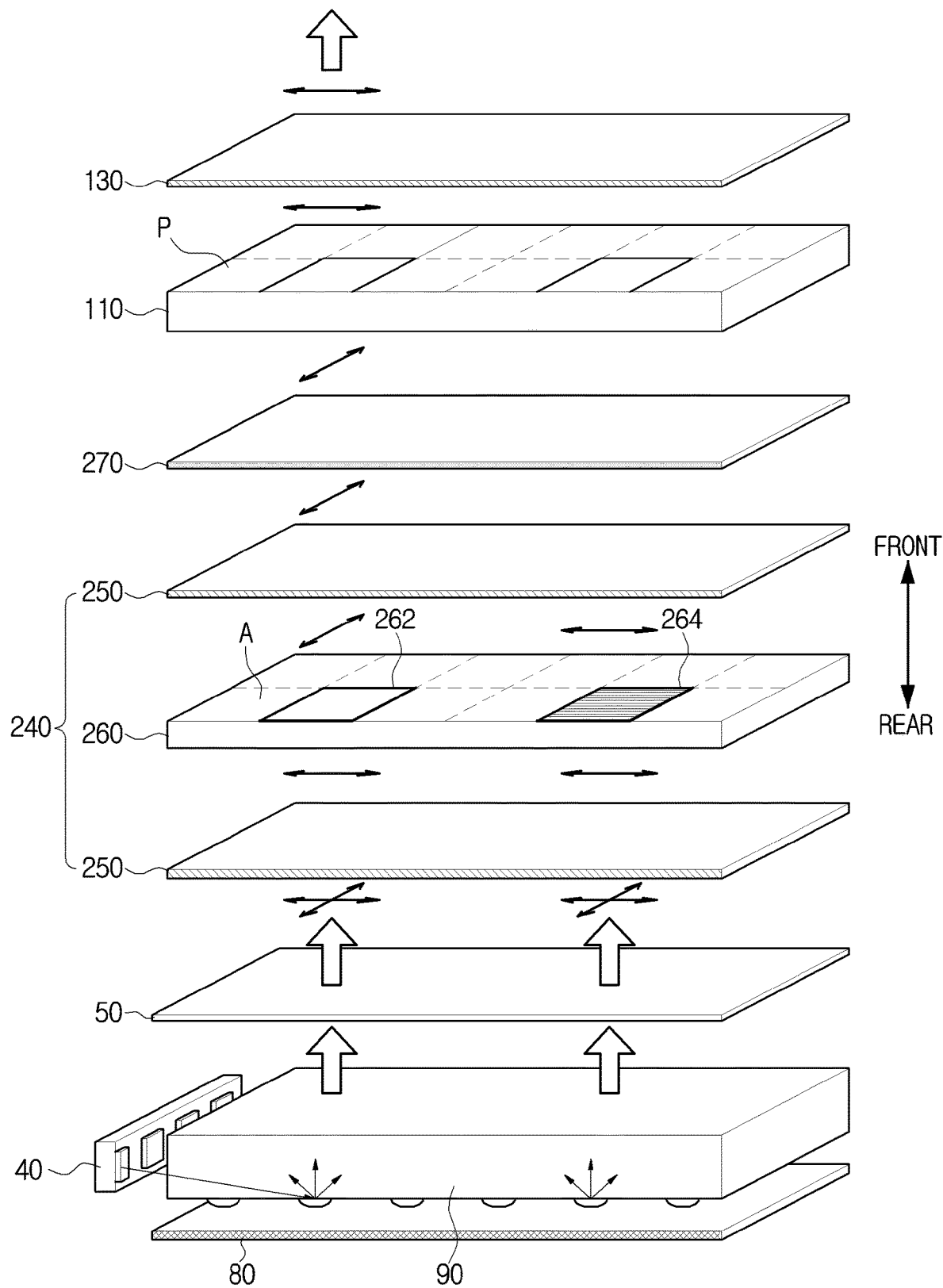
FIG. 8 shows a light path of a display apparatus according to an embodiment.

FIG. 8 shows a light path of a display apparatus according to an embodiment.

A shutter panel 240 may include a pair of shutter polarizing layers 250 and a shutter layer 260 positioned between the pair of shutter polarizing layers 250.

The shutter layer 260 may include a plurality of operating units A. The shutter layer 260 may have a plurality of operating units A to correspond to the plurality of pixels P of the liquid crystal panel 110. However, a predetermined number of pixels P may be arranged to correspond to one operating unit A of the shutter layer 260, and a plurality of pixels P arranged in a predetermined direction may correspond to one operating unit A of the shutter layer 260. The liquid crystal panel 110 and the shutter panel 240 may be controlled independently. Therefore, the plurality of operating units A of the shutter layer 260 may operate independently with respect to the plurality of pixels P of the liquid crystal panel 110. The plurality of operating units A of the shutter layer 260 may operate as any one of a selected area 262 and a unselected area 264, individually.

Also, the plurality of operating units A may operate independently to block or transmit light traveling toward the liquid crystal panel 110 from the backlight unit 20.

The display panel 100 may include a quantum rod layer 270. The quantum rod layer 270 may be disposed on a rear surface of the first transparent substrate 111 of the liquid crystal panel 110. That is, the quantum rod layer 270 may be disposed between the liquid crystal panel 110 and the shutter polarizing layer 250 of the shutter panel 240.

By emitting stronger fluorescence with respect to light whose intensity is reduced when passing through the shutter panel 240, the quantum rod layer 270 may increase the intensity of the light. Simultaneously, the quantum rod layer 270 may provide a polarizing property to thereby radiate light having a polarizing axis of a first direction toward the liquid crystal panel 110.

Hereinafter, a display apparatus according to an embodiment of the present disclosure will be described. Descriptions of the same components as those described above will be omitted.

Figure 9:
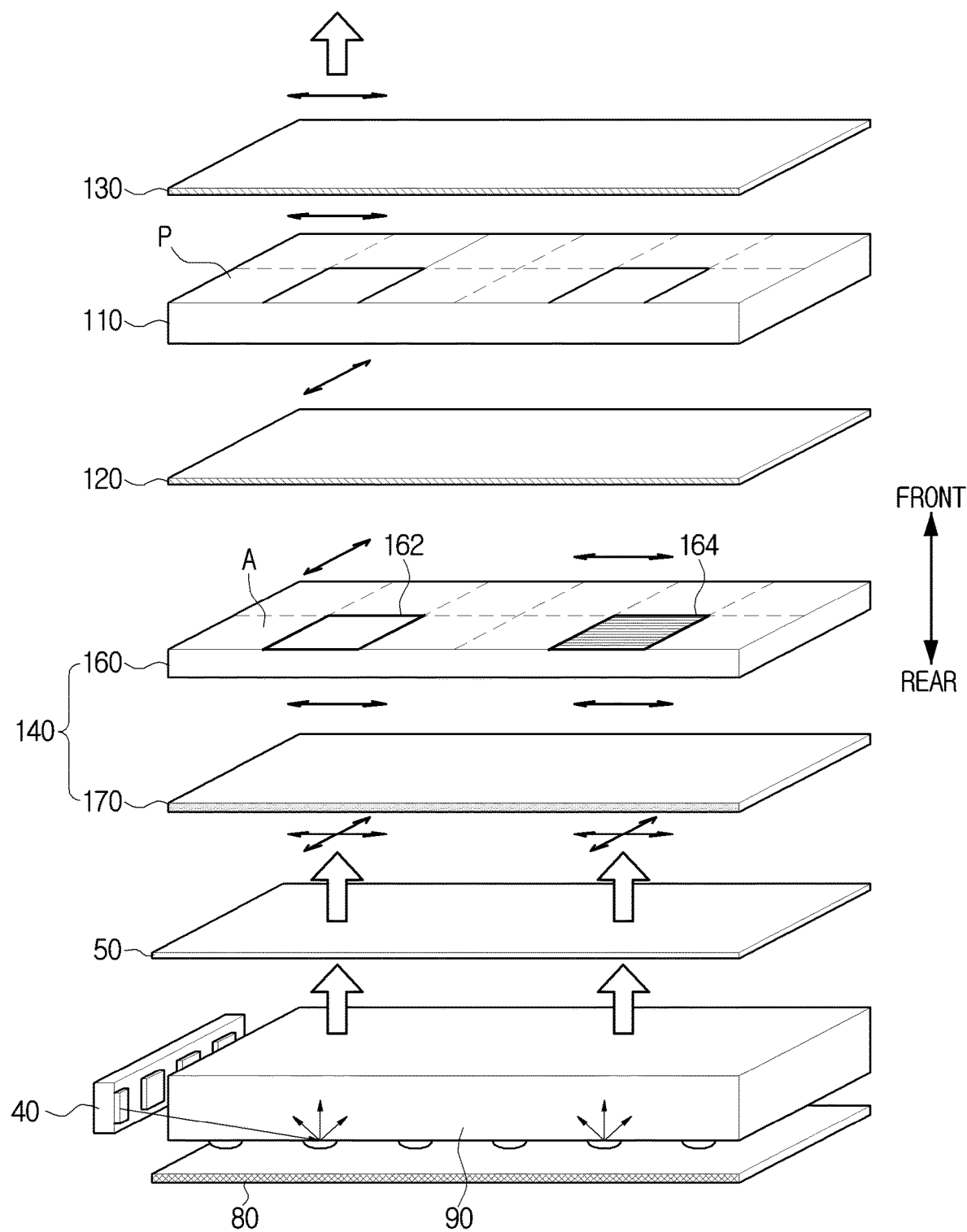
FIG. 9 shows a light path of a display apparatus according to an embodiment.

FIG. 9 shows a light path of a display apparatus according to still another embodiment of the present disclosure.

The shutter panel 140 may include the shutter layer 160 and the quantum rod layer 170.

On the outer surfaces of the liquid crystal panel 110, the polarizing plates 120 and 130 may be disposed. The polarizing plates 120 and 130 may include a first polarizing plate 120 disposed on the outer surface of the first transparent substrate 111, and a second polarizing plate 130 disposed on the outer surface of the second transparent substrate 112.

The first polarizing plate 120 may be disposed between the shutter layer 160 and the liquid crystal panel 110. The first polarizing plate 120 may be configured to transmit polarized light passing through the selected area 162 among light exiting the shutter layer 160. Light transmitted through the first polarizing plate 120 may be incident to the liquid crystal panel 110, and formed as an image. According to an embodiment, a single shutter polarizing layer 170 may be configured, and the first polarizing plate 120 may be disposed between the liquid crystal panel 110 and the shutter layer 160. However, a pair of shutter polarizing layers 170 may be respectively disposed on the front and rear surfaces of the shutter layer 160 to position the shutter polarizing layer 170 between the shutter layer 160 and the liquid crystal panel 110.

According to an aspect of the present disclosure, a display apparatus for implementing local dimming may be provided.

According to an aspect of the present disclosure, it may be possible to improve a local dimming structure, thereby improving the image quality and light efficiency of a display apparatus.

According to an aspect of the present disclosure, a display apparatus capable of improving color reproduction may be provided.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
    a light source configured to emit light; and
    a display panel configured to receive the light emitted from the light source,
    wherein the display panel comprises:
        a liquid crystal panel; and
        a shutter panel configured to selectively transmit the light received from the light source toward the liquid crystal panel,
        wherein the shutter panel comprises:
            a shutter layer comprising a selected area configured to change a polarizing axis of light transmitted therethrough;
            a shutter polarizing layer disposed on a first surface of the shutter layer, the shutter polarizing layer being configured to transmit the light having the polarizing axis changed by the shutter layer; and
            a quantum rod layer disposed on a second surface of the shutter layer that is opposite to the first surface of the shutter layer, the quantum rod layer being configured to convert a wavelength of light incident on the shutter panel, and to transmit light having a polarizing axis of a predetermined direction to the shutter layer.

2. The display apparatus according to claim 1, wherein the quantum rod layer is further configured to transmit light forming a polarizing axis of a first direction,
    a polarizing axis of light transmitted from the quantum rod layer is changed from the first direction to a second direction when the light is transmitted through the selected area of the shutter layer, and
    the light transmitted through the selected area is transmitted through the shutter polarizing layer.

3. The display apparatus according to claim 2, wherein the shutter layer further comprises an unselected area configured to maintain a polarizing axis of light, and
    the shutter polarizing layer is configured to block light transmitted through the unselected area.

4. The display apparatus according to claim 2, wherein the first direction is orthogonal to the second direction.

5. The display apparatus according to claim 1, wherein the liquid crystal panel and the shutter panel are controlled independently.

6. The display apparatus according to claim 1, wherein the shutter layer comprises a plurality of operating units configured to individually operate as any one of the selected area configured to change the polarizing axis of light and an unselected area configured to maintain a polarizing axis of light.

7. The display apparatus according to claim 6, wherein the liquid crystal panel comprises a plurality of pixels configured to form an image, and
    one operating unit of the plurality of operating units is disposed to correspond to at least one pixel of the plurality of pixels.

8. The display apparatus according to claim 7, wherein the plurality of operating units are disposed to correspond to the plurality of pixels, respectively.

9. The display apparatus according to claim 6, wherein the plurality of operating units operate independently.

10. The display apparatus according to claim 1, wherein the shutter layer is formed with a plurality of liquid crystal molecules configured to change arrangement based on a presence of an electric field to change a polarizing axis of incident light.

11. The display apparatus according to claim 1, wherein the shutter panel has a width corresponding to the liquid crystal panel.

12. The display apparatus according to claim 1, wherein the display panel further comprises:
- a first polarizing plate disposed on a first surface of the liquid crystal panel, the first polarizing plate being configured to transmit light transmitted through the shutter polarizing layer; and
- a second polarizing plate disposed on a second surface of the liquid crystal panel, opposite to the first surface, the second polarizing plate being configured to transmit light having a polarizing axis that is changed by the liquid crystal panel.

13. The display apparatus according to claim 1, wherein the shutter panel is disposed between the liquid crystal panel and the light source.

14. The display apparatus according to claim 13, wherein the quantum rod layer is disposed between the shutter layer and the light source.

15. A display apparatus comprising:
a display panel configured to receive light emitted from a light source,
wherein the display panel comprises:
- a liquid crystal panel having a plurality of pixels configured to form an image; and
- a shutter panel disposed between the liquid crystal panel and the light source,
wherein the shutter panel comprises:
  - a shutter layer comprising a plurality of operating units individually operating as one of a selected area and an unselected area, the shutter layer being configured to change a polarizing axis of light transmitted through the selected area;
  - a shutter polarizing layer disposed on a first surface of the shutter layer, the shutter polarizing layer being configured to transmit the light having the polarizing axis changed by the shutter layer; and
  - a quantum rod layer configured to convert a wavelength of light incident on the shutter panel, and to cause the incident light to form a polarizing axis of a predetermined direction.

16. The display apparatus according to claim 15, wherein one operating unit among the plurality of operating units is disposed to correspond to at least one pixel of the plurality of pixels.

17. The display apparatus according to claim 15, wherein the quantum rod layer is configured to transmit light forming a polarizing axis of a first direction,
- a polarizing axis of light transmitted from the quantum rod layer is changed from the first direction to a second direction when the light is transmitted through the selected area of the shutter layer, and
- the light transmitted through the selected area is transmitted through the shutter polarizing layer.

18. The display apparatus according to claim 17, wherein the unselected area is different from the selected area, and
- the shutter polarizing layer is configured to block light through the unselected area.

19. The display apparatus according to claim 17, wherein the first direction is orthogonal to the second direction.

20. A display apparatus comprising:
- a light source configured to emit light; and
- a display panel configured to receive the light emitted from the light source,
wherein the display panel comprises:
  - a liquid crystal panel;
  - a shutter panel comprising a shutter layer operating as a selected area and a unselected area, and at least one polarizing layer configured to transmit light transmitted through the selected area, the shutter layer configured to selectively block light transmitted toward the liquid crystal panel; and
  - a quantum rod layer disposed between the liquid crystal panel and the shutter panel, the quantum rod layer being configured to convert a wavelength of light incident on the liquid crystal panel and to cause the light incident on the liquid crystal panel to have a polarizing axis of a predetermined direction.

* * * * *